Oct. 14, 1930.   A. KUTZER   1,778,326
SINK FOR THE SEPARATION OF VOLATILE LIQUIDS FROM WASTE WATER
Filed July 10, 1928
Fig:1
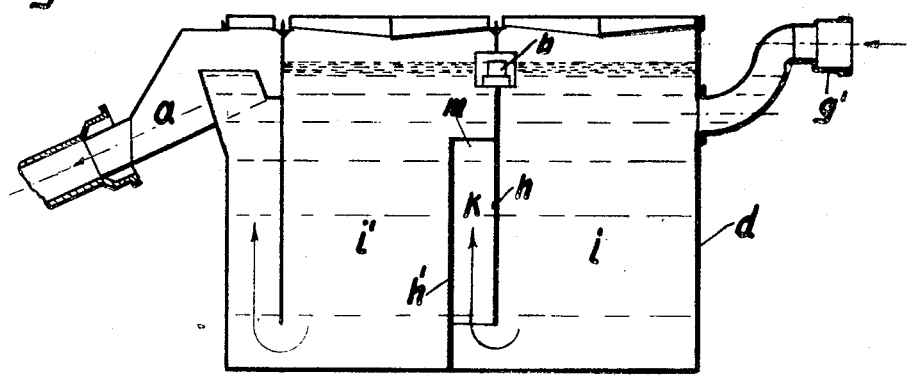
Fig:2
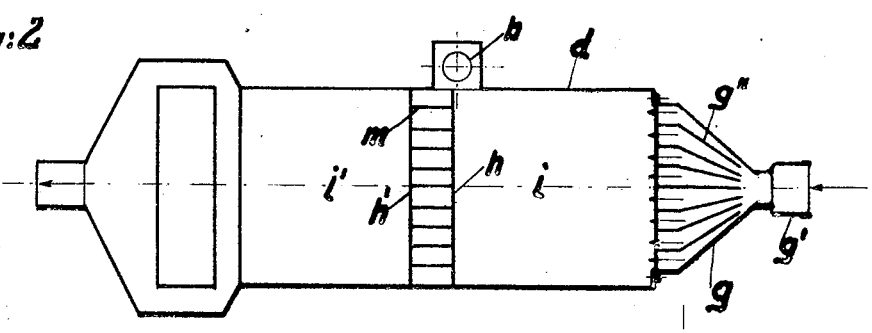
Fig:3
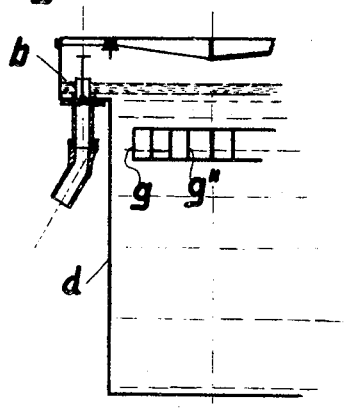
Fig:4
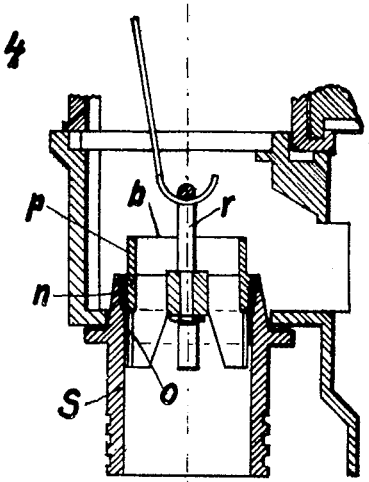
Inventor
Adolf Kutzer
by [signature]
Attorney Patented Oct. 14, 1930

1,778,326

UNITED STATES PATENT OFFICE

ADOLF KUTZER, OF LEIPZIG-STUNZ, GERMANY

SINK FOR THE SEPARATION OF VOLATILE LIQUIDS FROM WASTE WATER

Application filed July 10, 1928, Serial No. 291,542, and in Germany December 12, 1927.

Waste water as it is discharged from motor garages, washing circus for automobiles, or from chemical factories, laundries and like establishments usually contains quantities of volatile liquids in finely divided state, and it is difficult to sufficiently separate these liquids from the water before the latter is allowed to enter the drains and to thus remove danger.

The invention has for its main object the provision of a sink such as will enable an entirely satisfactory separation of such specifically light liquids, and in which there will prevail a permanent condition of undisturbance, which condition even will not materially become affected by the inflow of the waste water into the sink. Provision will also be made for an additional updrift of the finely divided volatile liquids in the sink so as to enable their better accumulation at the surface.

According to the invention these objects are attained by causing the waste water to enter the sink through a wide inlet compartment which is subdivided into a number of individual branches or channels, in which the velocity of the inflowing water is considerably reduced. The waste water eventually enters the amply spaced depositing and separating chamber in a quiet flow below the liquid level; care being taken that no baffling plates or other obstructions shall be placed in the way of the liquid currents, which otherwise would disturb the process of separation or even cause a new mixing-up of the liquids.

The depositing and separating chamber is preferably divided into two or more compartments in such a manner, that the waste water is forced to pass at suitably slow speed from one compartment into the next following through one or more narrow shafts or vertical passages, whereby such particles of volatile liquid, as have not been separated in the first compartment, will receive a motive impulse which will carry them to the surface where they eventually collect above the water level.

The accompanying drawing illustrates the invention by way of example.

Fig. 1 is a longitudinal section through the improved sink;

Fig. 2 represents a horizontal section;

Fig. 3 shows a sectional view of a part of the sink;

Fig. 4 is a detail showing the oil overflow in sectional elevation.

In these figures $d$ is a tank constituting the sink proper and having a discharge $a$ for the cleared waste water and, at a correspondingly higher lever, an overflow $b$ for the separated volatile oil. The sink is further provided with a broad inlet compartment $g$ which widens considerably from the inlet socket $g'$ in the direction of the tank $d$ and which is divided into a number of individual passages by means of vertical partitions $g''$ (Figs. 2 and 3). In this inlet compartment the velocity of the inflowing water is reduced to such an extent as to not materially affect the inert state of the liquid in the tank and to thus enable an undisturbed separation of the specifically light liquids from the waste water. A partition $h$ is provided at about the centre of the tank $d$ which extends from the top down to some distance above the bottom of the sink, so that the passage of the water from the compartment $i$ into the compartment $i'$ will have to take place at a low level in the sink.

The overflow $b$ for the separated volatile oil is preferably provided with a spout $p$ resting in a conical or other part of the overflow pipe $s$ and forming an extension of the same; the upper edge of the said pipe $s$ lying in approximately the same horizontal plane as the upper edge of the water discharge $a$. A ring, hook or the like $r$ serves to lift the spout $p$ from its seat on the pipe $s$.

It is evident that owing to the considerably raised level of the oil overflow by means of the said spout any discharge of water together with the overflowing oil at $b$ will be successfully prevented. By lifting the spout from its seat the whole quantity of the collected oil may be drawn off whenever it is desired to empty the tank $d$ for example when cleaning the sink from sediments.

In close proximity to the aforementioned partition $h$ another partition $h'$ is arranged which extends from the bottom of the vessel *d* upwardly to some distance below the liquid level (Fig. 1). This partition together with the partition *h* forms a narrow passage in which the waste water, on its way from the chamber *i* to the chamber *i'*, flows upwardly at an increased speed and thereby imparts an updrifting motion to such of the volatile oil particles as have not settled in the chamber *i*. These particles are thus able to rise and collect above the level of the water in the sink.

The process of separation of the volatile liquids from the waste water may be further enhanced by dividing the passage between the partitions *h* and *h'* by vertical subpartitions *m* into a greater number of narrow channels or shafts (Fig. 2). The volatile particles which are contained in the water in an infinitesimally fine division are caused by the flow of the water to settle themselves upon these partitions until they unite and thus increase in volume and eventually attain the necessary updrift due to their specific weight.

What I claim is:—

1. In a sink for the separation of volatile liquids from waste water, a tank constituting the sink proper, a partition extending from the top of the tank down to a point some distance above the bottom thereof, another partition adjacent to the first-named partition and extending from the bottom of the said tank upwards to a point some distance below the liquid level thereof, and a plurality of cross partitions between the said two partitions and subdividing the space therebetween into a plurality of inlet passages having their entrances near the bottom of the said tank and opening thereinto at a point below the liquid level in the same.

2. In a sink for the separation of volatile liquids from waste water comprising an overflow for the collected oil, the said overflow having an upper inlet end extending to the level of the water discharged, a spout detachably fitted in said end of the overflow to increase its height to a level above the level of the discharge water, said spout having a sealing engagement with the pipe and supported solely thereon for free vertical removal therefrom and being slidably applicable to and removable from said overflow inlet, and manually operable pull means for withdrawing the said spout.

3. In a sink for the separation of volatile liquids from waste water comprising an overflow for the collected oil, the said overflow having an upper inlet end extending to the level of the water discharged, a spout detachably fitted in said end of the overflow to increase its height to a level above the level of the water discharged, said spout being supported solely on said inlet end of the overflow for free vertical removal therefrom, and means for disengaging said spout.

4. In a sink for the separation of volatile liquids from waste water comprising an overflow for the collected oil, an overflow pipe extending upwardly to the level of the water discharged, a spout extending above the upper end of the overflow pipe so as to increase the height of the said pipe, said spout being supported solely for free vertical removal from the pipe on an upward pull being exerted thereon, and means for exerting an upward pull on the spout for removing it.

5. In a sink for the separation of volatile liquids from waste water comprising an overflow for the collected oil, an overflow pipe extending upwardly to the level of water discharged, a seat at the upper end of said overflow pipe, a spout frictionally fitted in and extending above said seat so as to increase the height of the said overflow pipe and so as to be normally withdrawable therefrom, and a handle member on the said spout by which the same may be manually withdrawn from engagement with said overflow pipe.

In testimony whereof I affix my signature.

ADOLF KUTZER.